United States Patent
Guo et al.

(10) Patent No.: US 11,339,556 B2
(45) Date of Patent: May 24, 2022

(54) DEVICE AND METHOD FOR OBTAINING WATER FROM AIR ON ISLAND

(71) Applicant: Dongguan University of Technology, Guangdong (CN)

(72) Inventors: Xiaojuan Guo, Guangdong (CN); Yongjun Xu, Guangdong (CN)

(73) Assignee: Dongguan University of Technology, Guangdong (CN)

(*) Notice: Subject to any disclaimer, the term of this patent is extended or adjusted under 35 U.S.C. 154(b) by 519 days.

(21) Appl. No.: 16/489,224

(22) PCT Filed: Nov. 23, 2017

(86) PCT No.: PCT/CN2017/112609
§ 371 (c)(1),
(2) Date: Aug. 27, 2019

(87) PCT Pub. No.: WO2018/157628
PCT Pub. Date: Sep. 7, 2018

(65) Prior Publication Data
US 2020/0018050 A1    Jan. 16, 2020

(30) Foreign Application Priority Data
Mar. 3, 2017    (CN) .......................... 201710124295.7

(51) Int. Cl.
*C02F 1/04* (2006.01)
*B01D 5/00* (2006.01)
(Continued)

(52) U.S. Cl.
CPC ................ *E03B 3/28* (2013.01); *C02F 1/001* (2013.01); *C02F 1/04* (2013.01); *B01D 5/006* (2013.01); *C02F 2303/04* (2013.01)

(58) Field of Classification Search
CPC .......................................................... E03B 3/28
(Continued)

(56) References Cited

U.S. PATENT DOCUMENTS 4,146,372 A * 3/1979 Groth .................... E03B 3/28
96/144
5,050,390 A * 9/1991 Assaf .................... F24F 3/1417
62/271
(Continued)

FOREIGN PATENT DOCUMENTS

CN       101365846 A    2/2009
CN       102031803 A    4/2011
(Continued)

OTHER PUBLICATIONS

English translation of China Published Application No. CN103073083; Publication Date: May 1, 2013; 13 pages.
(Continued)

*Primary Examiner* — Nina Bhat
(74) *Attorney, Agent, or Firm* — Blank Rome LLP

(57) ABSTRACT

A device for obtaining water from air on an island includes: a concentrated solution air water obtaining system, a solar collector, a dilute solution dehydration system, a heat pump system, a solution heating system, and a water purification system. Humid air is introduced into the concentrated solution air water obtaining system, which performs a heat and mass transfer into a dilute solution and relatively low-temperature dry air. This air is used as interior fresh air. The diluted solution is heated by the solar collector, delivered to the dilute solution dehydration system, and sent to the solution heating system for heating and evaporating into water vapor. The water purification system cools, purifies, filters and stores the water vapor. At the same time, the heat pump system introduces heated humid air into the dilute (Continued)

solution dehydration system to recover heat contained in the heated humid air, and to extract water.

8 Claims, 2 Drawing Sheets

(51) Int. Cl.
*E03B 3/28* (2006.01)
*C02F 1/00* (2006.01)

(58) Field of Classification Search
USPC ...... 203/10; 202/185.1; 261/5, 136, DIG. 65
See application file for complete search history.

(56) References Cited

U.S. PATENT DOCUMENTS

| | | | | |
|---|---|---|---|---|
| 9,475,707 | B2* | 10/2016 | John | F24S 40/20 |
| 10,829,913 | B1* | 11/2020 | Ahmed | C02F 1/441 |
| 10,835,861 | B2* | 11/2020 | Friesen | B01D 53/0454 |
| 10,899,635 | B2* | 1/2021 | Jiang | C02F 1/16 |
| 2002/0046569 | A1* | 4/2002 | Faqih | C02F 9/005 62/93 |
| 2014/0053580 | A1* | 2/2014 | Ferreira | F25D 21/06 62/140 |
| 2018/0127954 | A1* | 5/2018 | Bravo | B01D 46/0036 |
| 2018/0171604 | A1* | 6/2018 | Kim | B01J 20/3204 |

FOREIGN PATENT DOCUMENTS

| | | |
|---|---|---|
| CN | 102677739 A | 9/2012 |
| CN | 103073083 A | 5/2013 |
| CN | 103443552 A | 12/2013 |
| CN | 104563210 A | 4/2015 |
| CN | 104801157 A | 7/2015 |
| CN | 105113575 A | 12/2015 |
| CN | 106906874 A | 6/2017 |
| DE | 102008028080 A1 | 12/2009 |
| JP | H1071320 A | 3/1998 |
| WO | 200240925 A1 | 5/2002 |

OTHER PUBLICATIONS

English translation of China Published Application No. CN101365846; Publication Date: Feb. 11, 2009; 16 pages.
English translation of China Published Application No. CN104801157; Publication Date: Jul. 29, 2015; 13 pages.
English translation of Japan Published Application No. JPH1071320; Publication Date: Mar. 17, 1998; 20 pages.
International Search Report with English translation dated Feb. 27, 2018; International Application No. PCT/ CN2017/112609; International Filing Date: Nov. 23, 2017; 6 pages.
Written Opinion dated Feb. 27, 2018; International Application No. PCT/CN2107/112609; International Filing Date: Nov. 23, 2017; 4 pages.
English translation; China Published Application No. CN 102031803; publication date Apr. 27, 2011; 9 pages.
English translation; China Published Application No. CN106906874; publication date Jun. 30, 2017; 17 pages.
English translation; China Published Application No. CN103443552; publication date Dec. 11, 2013; 8 pages.
English translation; China Published Application No. CN102677739; publication date Sep. 19, 2012; 11 pages.
English translation; German Published Application No. DE102008028080; publication date Dec. 24, 2009; 41 pages.
English translation; International Published Application No. WO0240925; publication date May 23, 2002; 12 pages.
English translation; China Published Application No. CN105113575; publication date Dec. 2, 2015; 1 page.
English translation; China Published Application No. CN104563210; publication date Apr. 29, 2015; 8 pages.

* cited by examiner

DEVICE AND METHOD FOR OBTAINING WATER FROM AIR ON ISLAND

RELATED APPLICATIONS

This application is a U.S. national phase application of International Application No. PCT/CN2017/112609, filed Nov. 23, 2017; which application claims benefit of priority of China Application No. 201710124295.7, filed Mar. 3, 2017. Each of the above-identified related applications are incorporated by reference.

FIELD OF USE

The present invention relates to a technology for obtaining water from air, and in particular, to a device and method for obtaining water from air on an island.

BACKGROUND OF THE INVENTION

At present, ways to obtain fresh water on an island without fresh water include one by seawater desalination, and the other by shipping or air transportation. Once a water source of the island in an offshore water is polluted and destroyed, the supply of fresh water will be cut off. As the island has high humidity which contains rich fresh water, researching a device for obtaining fresh water from the island's air is a new and important way to meet a need of a human living on the island.

A relevant research has been carried out at home and abroad on the technology for obtaining water from air. The main water obtaining methods include a moisture absorption/desorption method and a refrigeration condensation method. The primary energy of a water obtaining device includes solar energy, wind energy and tidal energy, etc.

For example, a patent of publication No. CN202882020U relates to a device for obtaining water from air by using wind energy, which uses the refrigeration condensation method for obtaining water; a patent of publication No. CN105113574 uses wind energy as power and seawater as a cold source to liquefy a water vapor in air to provide fresh water for living of a resident who lives in a small island away from the mainland; patents of publication No. CN204163145U and CN203462517U relate to a device for obtaining water from air by using solar energy, both of which obtain water by using a method of utilizing solar energy to provide a cooling environment in which an air temperature is lowered to a dew point temperature to form a water droplet; a patent of publication No. CN105113575A relates to a device entirely driven by tidal energy, where water in air is liquefied, and this is also a refrigeration condensation method; patents of publication No. CN104563210A and CN205171589 relate to obtaining of water from air by using a rotary dehumidification device, where a rotary wheel regenerates in a regeneration environment to obtain a water vapor, and this is a moisture absorption/desorption method.

The prior art does not consider the problem of how to treat the air after the water is extracted, but the air is directly discharged. At present, dry air required by the mainland's human settlement environment and storage room is realized by air conditioning, and the energy consumption of the air conditioning exceeds 40% of that required for normal operation of human life. The air humidity on an island is above 90%, and contains a certain amount of salt. An existing air conditioning technology can achieve relatively low-temperature and low-humidity air required by a human settlement environment, but the energy consumption is high, and the problem of salt contained in the air is one of the problems that have not been effectively solved by the existing air conditioning technology.

In summary, none of the above methods considers the problems such as utilization of dry air after the extraction of fresh water, energy conservation, and enlargement and industrialization of equipment.

Therefore, the prior art has yet to be improved.

SUMMARY OF THE INVENTION

In view of the above deficiencies of the prior art, an objective of the present invention is to provide a device and method for obtaining water from air on an island, which can reasonably utilize air generated by the obtaining of the water and improve the total energy efficiency of the device for obtaining water.

In order to achieve the above objective, the present invention adopts the following technical solutions.

A device for obtaining water from air on an island, including: a concentrated solution air water obtaining system, a solar collector, a dilute solution dehydration system, a heat pump system, a solution heating system and a water purification system, where humid air on the island is introduced into the concentrated solution air water obtaining system, and the concentrated solution air water obtaining system performs a heat and mass transfer to turn the humid air into a dilute solution and relatively low-temperature dry air; the relatively low-temperature dry air is sent into the interior of an island building as interior fresh air, and the diluted solution is sent to the solar collector to be heated and delivered to the dilute solution dehydration system; the dilute solution dehydration system sends the dilute solution to the solution heating system for heating; then the dilute solution is sent back to the dilute solution dehydration system for dehydration to evaporate water in the dilute solution, and a water vapor accompanied with air is sent to the water purification system; the water purification system cools, purifies, filters and stores the water vapor; at the same time, the heat pump system introduces heated humid air of the island into the dilute solution dehydration system, in which the heated humid air is subjected to a heat and mass transfer with the dilute solution to recover heat contained in the heated humid air, and extract water contained in the heated humid air.

In the device for obtaining water from air on an island, the concentrated solution air water obtaining system includes a moisture absorber and a moisture absorption liquid tank; a liquid outlet of the moisture absorber is connected with the moisture absorption liquid tank, and an air outlet of the moisture absorber is connected with the interior of the island building; a first liquid outlet of the moisture absorption liquid tank is connected with the dilute solution dehydration system through the solar collector, and a second liquid outlet of the moisture absorption liquid tank is connected with the dilute solution dehydration system.

In the device for obtaining water from air on an island, the dilute solution dehydration system includes a regeneration liquid tank, a vapor-water separation tank and a first check valve; a first liquid inlet of the regeneration liquid tank is connected with the second liquid outlet of the moisture absorption liquid tank, a second liquid inlet of the regeneration liquid tank is connected with the solar collector, and a liquid outlet of the regeneration liquid tank is connected with a liquid inlet of the vapor-water separation tank through the solution heating system and the first check valve.

In the device for obtaining water from air on an island, the heat pump system includes an air cooler, a compressor, an electronic expansion valve and an evaporator; the air cooler, the electronic expansion valve, the evaporator and the compressor are sequentially connected to form a circulation loop; an air outlet line of the air cooler is connected with the vapor-water separation tank; a solution outlet of the evaporator is connected to the moisture absorber.

In the device for obtaining water from air on an island, a first two-way valve is disposed between the moisture absorption liquid tank and the evaporator, and a second check valve is disposed between the solution outlet of the evaporator and the moisture absorber; the moisture absorption liquid tank, the first two-way valve, a solution delivery line of the evaporator, the second check valve and the moisture absorber are sequentially connected to form a loop.

In the device for obtaining water from air on an island, the solution heating system includes a heat exchanger, a water heater, and a hot water circulation tank; the heat exchanger, the hot water circulation tank and the water heater are sequentially connected to form a circulation loop; the liquid outlet of the regeneration liquid tank is connected to the first check valve through the heat exchanger.

In the device for obtaining water from air on an island, the water purification system includes a distilled water separator, a purification filter and a fresh water tank; an inlet of the distilled water separator is connected to a vapor-water outlet of the vapor-water separation tank, and a water outlet of the distilled water separator, the purification filter and the fresh water tank are sequentially connected.

In the device for obtaining water from air on an island, a second two-way valve is disposed between the liquid outlet of the regeneration liquid tank and the heat exchanger.

A method for obtaining water for the device for obtaining water from air on an island, including the following steps:

introducing humid air on the island into a concentrated solution air water obtaining system, and performing, by the concentrated solution air water obtaining system, a heat and mass transfer to turn the humid air into a dilute solution and relatively low-temperature dry air, where the relatively low-temperature dry air is sent into the interior of an island building as interior fresh air;

sending the diluted solution to a solar collector to be heated and delivered to a dilute solution dehydration system;

sending, by the dilute solution dehydration system, the dilute solution to a solution heating system for heating, and then sending the dilute solution back to the dilute solution dehydration system;

spraying, by the dilute solution dehydration system, to evaporate water in the dilute solution, and inputting a water vapor accompanied with air to a water purification system; at the same time, introducing, by a heat pump system, heated humid air of the island into the dilute solution dehydration system, in which the heated humid air is subjected to a heat and mass transfer with the dilute solution to recover heat contained in the heated humid air, and extract water contained in the heated humid air; and cooling, purifying, filtering and storing, by the water purification system, the water vapor.

The method for obtaining water for the device for obtaining water from air on an island further includes: outputting cold air output from the heat pump system to the concentrated solution air water obtaining system.

Compared with the prior art, the present invention provides a device and method for obtaining water from air on an island, where the device for obtaining water from air on an island includes: a concentrated solution air water obtaining system, a solar collector, a dilute solution dehydration system, a heat pump system, a solution heating system and a water purification system; humid air on the island is introduced into the concentrated solution air water obtaining system, and the concentrated solution air water obtaining system performs a heat and mass transfer to turn the humid air into a dilute solution and relatively low-temperature dry air; the relatively low-temperature dry air is sent into the interior of an island building as interior fresh air, and the diluted solution is sent to the solar collector to be heated and delivered to the dilute solution dehydration system; the dilute solution dehydration system sends the dilute solution to the solution heating system for heating; then the dilute solution is sent back to the dilute solution dehydration system for dehydration to evaporate water in the dilute solution, and a water vapor accompanied with air is sent to the water purification system; the water purification system cools, purifies, filters and stores the water vapor; at the same time, the heat pump system introduces heated humid air of the island into the dilute solution dehydration system, in which heat contained in the heated humid air is recovered, and water contained in the heated humid air is extracted. The present invention realizes that the air generated in the moisture absorption process meets the temperature and humidity requirements of a human settlement environment and a material storage room, the air generated in the process is directly used as interior fresh air for a human to use, and the heat generated by the whole device is recycled, so that the total energy efficiency is high and the energy consumption is low.

DETAILED DESCRIPTION OF THE ILLUSTRATED EMBODIMENTS

The present invention provides a device and method for obtaining water from air on an island; the method for obtaining water from air on an island is designed by the principle that a lithium chloride saline solution adsorbs water in the air at different temperatures; high-concentration lithium chloride saline is used to absorb the water in the air, so that the saline is diluted, and after the water is obtained, dry air is provided for a human settlement environment and a material storage warehouse with an extremely high requirement for the humidity of the air or the like on the island; at the same time, the diluted saline is heated and treated by a saline solution regeneration device to distill and separate water from the saline to obtain fresh water; the device for obtaining water from air on an island of the present invention is suitable for production and promotion as large-scale equipment, and features low energy consumption in the process flow and a high energy-saving rate of the system, etc.

To make the objectives, technical solutions, and effects of the present invention clearer, the following describes the present invention in more detail with reference to accompanying drawings and embodiments. It should be understood that the embodiments described herein are merely used to explain the present invention, rather than to limit the present invention.

Figure 1:
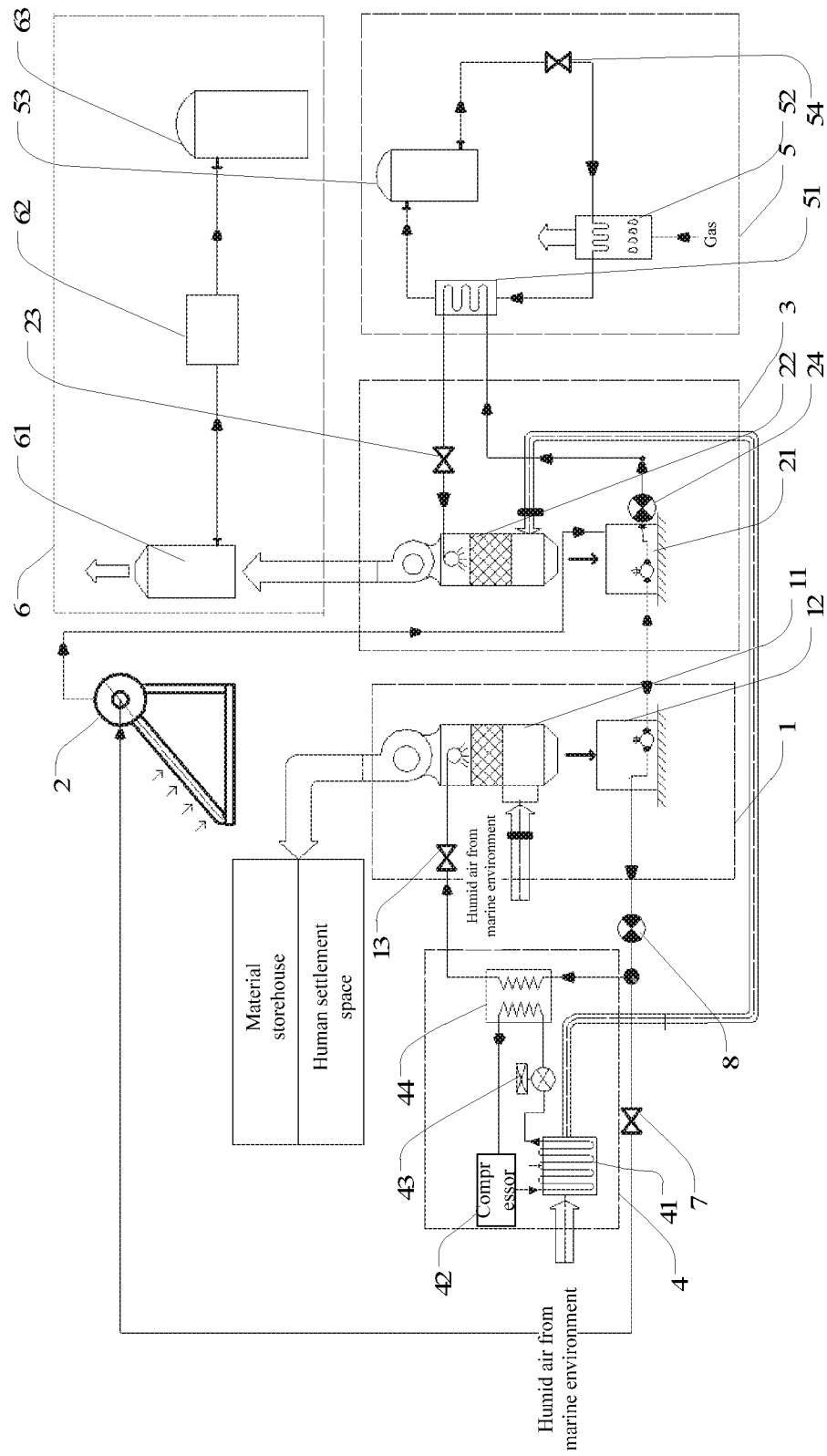
FIG. 1 is a schematic structural diagram of a device for obtaining water from air on an island provided by the present invention.

Referring to FIG. 1, a device for obtaining water from air on an island provided by the present invention includes a concentrated solution air water obtaining system 1, a solar collector 2, a dilute solution dehydration system 3, a heat pump system 4, a solution heating system 5 and a water purification system 6.

The concentrated solution air water obtaining system 1 is connected to the solar collector 2 and the heat pump system 4, and an output side of the solar collector 2 is connected to the dilute solution dehydration system 3; the concentrated solution air water obtaining system 1 absorbs humid air of the island, and performs a heat and mass transfer; then a lithium chloride saline solution is heated by the solar collector 2 and sent to the dilute solution dehydration system 3; the heat pump system 4 is used to cool a concentrated solution entering a moisture absorber from a moisture absorption liquid tank in the concentrated solution air water obtaining system 1, so that the concentrated solution absorbs more water at a low temperature. The solution heating system 5 is connected to the dilute solution dehydration system 3 for heating the solution in the dilute solution dehydration system 3 to evaporate water; the heat pump system 4 is also connected to the dilute solution dehydration system 3, and outputs heated air to help the dilute solution dehydration system 3 further evaporate more water by heat contained in the heated air; a water vapor outlet of the dilute solution dehydration system 3 is connected to the water purification system 6, and the water purification system 6 cools, purifies and filters a water vapor to obtain potable fresh water for use by an islander.

When the concentrated solution air water obtaining system 1 provided by the present invention obtains the fresh water, the humid air of the island is firstly introduced into the concentrated solution air water obtaining system 1; then the concentrated solution air water obtaining system 1 performs a heat and mass transfer between the lower-temperature and higher-concentration saline solution and the humid air of the island, thereby obtaining lower-temperature and lower-humidity dry air and a more dilute solution. The dry air is sent into the interior of an island building as interior fresh air for use by a human settlement space and material storage on the island; the concentrated solution absorbs the water in the air and is turned into a diluted solution; the diluted solution is sent to the solar collector 2 to be heated and delivered to the dilute solution dehydration system 3; the dilute solution dehydration system 3 sends the dilute solution to the solution heating system 5 for heating; then the dilute solution is sent back to the dilute solution dehydration system 3 for dehydration to evaporate water in the dilute solution, and a water vapor accompanied with air is sent to the water purification system 6; the water purification system 6 cools, purifies, filters and stores the water vapor. At the same time, the heated humid air of the island output from an air cooler in the heat pump system 4 is introduced into the dilute solution dehydration system 3 to recover heat in the humid air, and evaporate water in the humid air into the water purification system 6, thereby, on the one hand, realizing recovery of the heat contained in the humid air output by the heat pump system 4, and on the other hand, realizing the extraction of the water from this part of humid air. Moreover, the heat pump system 4 realizes the reduction of the temperature of the concentrated solution that is output from the solution of the moisture absorption liquid tank to the moisture absorber in the concentrated solution air water obtaining system 1, so that the low-temperature concentrated solution absorbs more water from the air through a heat and mass transfer with the humid air of the island, and lowers the temperature of the air to meet the requirements of a human settlement environment or a material storage room for the temperature and humidity of the air.

The present invention realizes that the air generated in the moisture absorption process meets the temperature and humidity requirements of the human settlement environment and the material storage room, the air generated in the process is directly used as interior fresh air for a human to use, and the heat generated by the whole device is recycled, so that the total energy efficiency is high and the energy consumption is low.

Referring to FIG. 1, the concentrated solution air water obtaining system 1 includes a moisture absorber 11 and a moisture absorption liquid tank 12; the moisture absorber 11 is provided with a spray tower apparatus, which can realize an efficient heat and mass transfer between the low-temperature concentrated solution and the humid air of the island. A liquid outlet of the moisture absorber 11 is connected with the moisture absorption liquid tank 12, and an air outlet of the moisture absorber 11 is connected with the interior of the island building for use of a human settlement space and material storage on the island. A first liquid outlet of the moisture absorption liquid tank 12 is connected with the dilute solution dehydration system 3 through the solar collector 2, and an output line of the moisture absorption liquid tank 12 flows to the dilute solution dehydration system 3 after primary heating by the solar collector 2; a second liquid outlet of the moisture absorption liquid tank 12 is connected with the dilute solution dehydration system 3, so that the moisture absorption liquid tank 12 is connected with the dilute solution dehydration system 3. In this way, the liquid of the whole system can be circulated and the efficiency is improved.

The dilute solution dehydration system 3 includes a regeneration liquid tank 21, a vapor-water separation tank 22 and a first check valve 23; a first liquid inlet of the regeneration liquid tank 21 is connected with the second liquid outlet of the moisture absorption liquid tank 12, a second liquid inlet of the regeneration liquid tank 21 is connected with the solar collector 2, and a liquid outlet of the regeneration liquid tank 21 is connected with a liquid inlet of the vapor-water separation tank 22 through the solution heating system 5 and the first check valve 23; an output line of the regeneration liquid tank 21 is subjected to secondary heating of the solution heating system 5, thereby accelerating evaporation of the dilute solution in the vapor-water separation tank 22; the regeneration liquid tank 21 is connected with the second liquid outlet of the moisture absorption liquid tank 12. In this way, the liquid of the whole system can be circulated and the efficiency is improved. In a specific implementation, the saline solution in the moisture absorption liquid tank 12 and the regeneration liquid tank 21 may be stratified, but the overall concentration in the moisture absorption liquid tank 12 is higher than that in the regeneration liquid tank 21, depending on the content of water in the concentration. Further, the solution of the moisture absorber 11 is extracted from the bottom of the moisture absorption liquid tank 12 (the concentration of the solution at the bottom of the moisture absorption liquid tank 12 is higher than the concentration of the solution at the upper part of the moisture absorption liquid tank 12 and the concentration of the saline solution in the moisture absorber after a heat and mass transfer) to the upper part of the moisture absorber 11 to be further subjected to a heat and mass transfer with the humid air of the island. Therefore, the present invention refers to the concentrated solution as a dilute solution after the heat and mass transfer is completed.

Referring to FIG. 1, the heat pump system 4 is a refrigeration system, including an air cooler 41, a compressor 42, an electronic expansion valve 43 and an evaporator 44; the air cooler 41, the electronic expansion valve 43, the evaporator 44 and the compressors 42 are sequentially connected to form a circulation loop; a heated air output line of the air cooler 41 is connected with the vapor-water separation tank 22; in a solution delivery line of the evaporator 44, a solution inlet of the evaporator 44 is connected to the moisture absorption liquid tank, and a solution outlet is connected to the moisture absorber 11; the concentrated solution output by the moisture absorption liquid tank is cooled in the solution delivery line of the evaporator 44, and then subjected to a heat and mass transfer with the humid air of the island to absorb more water from the air and lower the temperature of the air; the obtained low-temperature dry air can meet the requirements of a human settlement environment or a material storage room for the temperature and humidity of the air. The humid air of the island with a certain amount of heat output from the air cooler 41 is output to the vapor-water separation tank 22 through the air output line of the air cooler 41 to increase the temperature of the vapor-water separation tank 22, thereby more facilitating the evaporation of the dilute solution. The present invention reasonably utilizes the energy of each link to optimize the energy efficiency utilization.

Preferably, a first two-way valve 8 is disposed between the moisture absorption liquid tank 12 and the evaporator 44, and a second check valve 13 is disposed between the solution outlet of the evaporator 44 and the moisture absorber 11; the moisture absorption liquid tank 12, the first two-way valve 8, the solution delivery line of the evaporator 44, the second check valve 13 and the moisture absorber 11 are sequentially connected to form a loop; thus, the temperature of the solution in the moisture absorption liquid tank 12 is lowered by the evaporator 44, and then the solution is input to the moisture absorber 11 to become a lower-temperature concentrated saline solution to absorb more water.

Further, a third check valve 7 is disposed between the moisture absorption liquid tank 12 and the solar collector 2 to prevent the solution heated by the solar collector 2 from flowing back to the moisture absorption liquid tank 12 to affect the water absorption capacity of the moisture absorber 11.

The solution heating system 5 includes a heat exchanger 51, a water heater 52, and a hot water circulation tank 53; the heat exchanger 51, the hot water circulation tank 53, and the water heater 52 are sequentially connected to form a circulation loop; the liquid outlet of the regeneration liquid tank 21 is connected to the first check valve 23 through the heat exchanger 51. The dilute solution output from the regeneration liquid tank 21 is heated again by the solution heating system 5, and then sent to the vapor-water separation tank 22 for spray evaporation; after the evaporation, a water vapor is sent to the water purification system 6 for natural cooling to form liquid water and eliminate excess air.

A second two-way valve 24 is disposed between the liquid outlet of the regeneration liquid tank 21 and the heat exchanger 51, so that the liquid between the regeneration liquid tank 21 and the vapor-water separation tank 22 can be circulated, balancing the temperature of the solution on each link as far as possible. Further, a third two-way valve (not shown in the diagram) and a fourth check valve 54 are sequentially disposed between the hot water circulation tank 53 and the water heater 52; the fourth check valve 54 is mainly used to prevent the solution heated by the water heater 52 from flowing back to the hot water circulation tank 53, and the third two-way valve is mainly used to sample the liquid or the like.

The water purification system 6 includes a distilled water separator 61, a purification filter 62 and a fresh water tank 63; the distilled water separator 61 may be a cooling tower; an inlet of the distilled water separator 61 is connected to the vapor-water outlet of the vapor-water separation tank 22, and a water outlet of the distilled water separator 61, the purification filter 62 and the fresh water tank 63 are sequentially connected. A water vapor evaporated from the distilled water separator 61 is input to the distilled water separator 61 to be cooled into liquid water; then the liquid water is filtered by the purification filter 62 into potable fresh water, and the fresh water is collected by the fresh water tank 63.

For better understanding of the technical solutions of the present invention, the following describes the technical solutions of the present invention in detail below with reference to FIG. 1.

First, the concentrated solution air water obtaining system 1 realizes the process of absorbing water from the air by using a lithium chloride saline solution. Specifically, humid air from a marine environment enters the moisture absorber 11 and is subjected to a heat and mass transfer with the higher-concentration and lower-temperature lithium chloride saline solution introduced in the moisture absorption liquid tank 12; water in the humid air is absorbed by the higher-concentration and lower-temperature lithium chloride saline solution, and the temperature of the humid air is lowered to 18-20° C., and the humidity is reduced to 40%-50%; then relatively low-temperature and low-humidity air (temperature 18-20° C., relative humidity 40%-50%) is introduced by a fan into a human settlement space or a material storage warehouse on the island as interior fresh air.

Then, the diluted lithium chloride saline solution from which water is carried away by the heat and mass transfer is returned from the moisture absorber 11 to the moisture absorption liquid tank 12, and pumped into the solar collector 2 through a liquid pump at the bottom of the moisture absorption liquid tank 12 to absorb solar heat to raise its temperature in the solar collector 2, and flows into the regeneration liquid tank 21. The liquid pump at the bottom of the regeneration liquid tank 21 passes the higher-temperature solution through the heat exchanger 51; the solution is heated and heat-exchanged by the solution heating system 5 composed of the heat exchanger 51, the water heater 52, and the hot water circulation tank 53, and is then pumped into the vapor-water separation tank 22; the vapor-water separation tank 22 sprays to evaporate water in the lower-concentration and higher-temperature lithium chloride saline solution; at the same time, the air cooler 41 introduces heated humid air from the marine environment to be subjected to a heat and mass transfer with the dilute solution in the vapor-water separation tank 22, so that water in the air delivered by the air cooler 41 is absorbed by the dilute solution and evaporated; a water vapor accompanied with air is introduced into the distilled water separator 61 through an induced draft fan of the vapor-water separation tank 22, and is condensed into liquid water in the distilled water separator 61; the distilled water is purified, filtered and stored by the purification filter 62 and the fresh water tank 63 of the device.

The present invention realizes the repeated use of energy; the evaporator 44 in the heat pump system 4 lowers the temperature of the concentrated solution that enters the moisture absorber 11, which, on the one hand, more facilitates the absorption of the water from the air during the heat and mass transfer between the low-temperature concentrated solution and the humid air of the island, and on the other hand, can lower the temperature of the air, and obtain low-temperature dry air that can meet the requirements of a human settlement environment or a material storage room for the temperature and humidity of the air. At the same time, the moisture absorption liquid tank 12, the first two-way valve 8, a solution end of the evaporator 44, the second check valve 13 and the moisture absorber 11 are sequentially connected to form a loop, by which the liquid can flow to help lower the temperature of the concentrated solution air water obtaining system 1 to absorb more water, and reduce stratification of the solution in the moisture absorber 11, the moisture absorption liquid tank 12, the regeneration liquid tank 21 and the steam-water separation tank 22. The interior dry air provided by the present invention also effectively solves the problem of a salt content contained in the air faced by the existing air conditioning technology; in the moisture absorber 11 of the concentrated solution air water obtaining system 1, the humid air of the island is subjected to a heat and mass transfer with the low-temperature concentrated solution, and during this process, a salt spray in the air is also absorbed by the solution, so that the provided interior dry air is salt-free.

Figure 2:
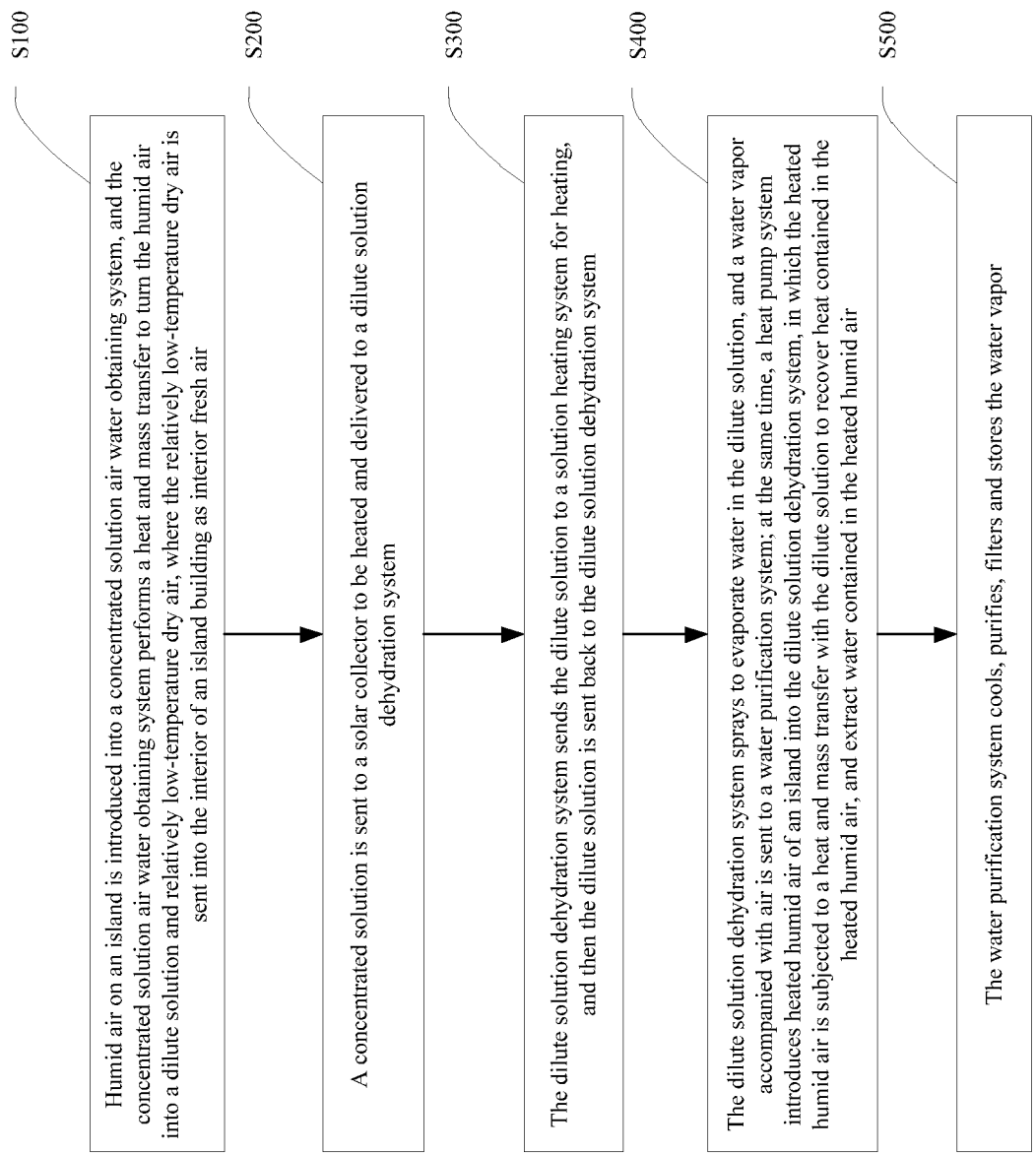
FIG. 2 is a flowchart of a method for obtaining water from air on an island provided by the present invention.

Based on the above device for obtaining water from air on an island, the present invention further provides a method for obtaining water for the device for obtaining water from air on an island. Referring to FIG. 2, the steps are as follows:

S100, humid air on the island is introduced into a concentrated solution air water obtaining system, and the concentrated solution air water obtaining system performs a heat and mass transfer to turn the humid air into a dilute solution and relatively low-temperature dry air, where the relatively low-temperature dry air is sent into the interior of an island building as interior fresh air;

S200, the diluted solution is sent to a solar collector to be heated and delivered to a dilute solution dehydration system;

S300, the dilute solution dehydration system sends the dilute solution to a solution heating system for heating, and then the dilute solution is sent back to the dilute solution dehydration system;

S400, the dilute solution dehydration system sprays to evaporate water in the dilute solution, and a water vapor accompanied with air is sent to a water purification system; at the same time, a heat pump system introduces heated humid air of the island into the dilute solution dehydration system, in which the heated humid air is subjected to a heat and mass transfer with the dilute solution to recover heat contained in the heated humid air, and extract water contained in the heated humid air; and S500, the water purification system cools, purifies, filters and stores the water vapor.

The method for obtaining water for the device for obtaining water from air on an island of the present invention further includes that: cold air output by the heat pump system is output to the concentrated solution air water obtaining system.

In summary, the present technology utilizes the capability of a saline solution (a lithium chloride saline solution) to absorb and release the water from the air at different temperatures and different concentrations, thereby realizing the extraction of fresh water from the air. Compared with the prior art, the present invention has the following beneficial effects:

1. the process and equipment used in the present invention are easy to industrialize and enlarge;

2. the air from which the fresh water is extracted, namely dehumidified air, can be provided as needed by a human settlement environment and a material storage warehouse;

3. the present invention utilizes the lithium chloride saline solution to absorb the water from the air, which incidentally solves the problem of a salt spray in the air, and is more energy-efficient than a dehumidification technology that uses a rotary wheel; and 4, the liquid circulates on each link and the heat and cold are reasonably used, so that the total energy efficiency of the system is high and the economic benefits are good.

It is understandable for a person of ordinary skill in the art that equivalent substitutions or changes can be made according to the technical solutions and inventive concepts of the present invention, and these substitutions or changes shall still fall within the protection scope of the claims of the present invention.

What is claimed is:

1. A device for obtaining water from air on an island, comprising:
    a concentrated solution air water obtaining system,
    a solar collector,
    a dilute solution dehydration system,
    a heat pump system,
    a solution heating system, and
    a water purification system, wherein:
        humid air on the island is introduced into the concentrated solution air water obtaining system, and the concentrated solution air water obtaining system performs a heat and mass transfer to turn the humid air into a dilute solution and relatively low-temperature dry air; the relatively low-temperature dry air is sent into the interior of an island building as interior fresh air, and the diluted solution is sent to the solar collector to be heated and delivered to the dilute solution dehydration system; the dilute solution dehydration system sends the dilute solution to the solution heating system for heating; then the dilute solution is sent back to the dilute solution dehydration system for dehydration to evaporate water in the dilute solution, and a water vapor accompanied with air is sent to the water purification system; the water purification system cools, purifies, filters and stores the water vapor;
        the concentrated solution air water obtaining system comprises a moisture absorber and a moisture absorption liquid tank; a liquid outlet of the moisture absorber is connected with the moisture absorption liquid tank, and an air outlet of the moisture absorber is connected with the interior of the island building; a first liquid outlet of the moisture absorption liquid tank is connected with the dilute solution dehydration system through the solar collector, and a second liquid outlet of the moisture absorption liquid tank is connected with the dilute solution dehydration system;
        the dilute solution dehydration system comprises a regeneration liquid tank, a vapor-water separation tank and a first check valve; a first liquid inlet of the regeneration liquid tank is connected with the second liquid outlet of the moisture absorption liquid tank, a second liquid inlet of the regeneration liquid tank is connected with the solar collector, and a liquid outlet of the regeneration liquid tank is connected with a liquid inlet of the vapor-water separation tank through the solution heating system and the first check valve; an output line of the regeneration liquid tank is subjected to secondary heating of the solution heating system, thereby accelerating evaporation of the dilute solution in the vapor-water separation tank;

the concentration of the solution at the bottom of the moisture absorption liquid tank is higher than the concentration of the solution at the upper part of the moisture absorption liquid tank after a heat and mass transfer with a saline solution in the moisture absorber; the solution of the moisture absorber is extracted from the bottom of the moisture absorption liquid tank to the upper part of the moisture absorber to be further subjected to a heat and mass transfer with the humid air of the island;

the moisture absorber is provided with a spray tower apparatus, which realizes an efficient heat and mass transfer between the low-temperature concentrated solution and the humid air of the island;

at the same time, the heat pump system introduces heated humid air of the island into the dilute solution dehydration system, in which the heated humid air is subjected to a heat and mass transfer with the dilute solution to recover heat contained in the heated humid air, and extract water contained in the heated humid air; an evaporator in the heat pump system lowers the temperature of the concentrated solution that enters the moisture absorber, which, on the one hand, more facilitates the absorption of the water and a salt spray from the air during the heat and mass transfer between the low-temperature concentrated solution and the humid air of the island, and on the other hand, lowers the temperature of the air, and obtains low-temperature dry air that can meet the requirements of a human settlement environment or a material storage room for the temperature and humidity of the air.

2. The device for obtaining water from air on an island according to claim 1, wherein the heat pump system comprises an air cooler, a compressor, an electronic expansion valve and an evaporator; the air cooler, the electronic expansion valve, the evaporator and the compressor are sequentially connected to form a circulation loop; a heated air outlet line of the air cooler is connected with the vapor-water separation tank; a solution outlet of the evaporator is connected to the moisture absorber.

3. The device for obtaining water from air on an island according to claim 2, wherein a first two-way valve is disposed between the moisture absorption liquid tank and the evaporator, and a second check valve is disposed between a cold air outlet of the evaporator and the moisture absorber; the moisture absorption liquid tank, the first two-way valve, the evaporator, the second check valve and the moisture absorber are sequentially connected to form a loop.

4. The device for obtaining water from air on an island according to claim 2, wherein the solution heating system comprises a heat exchanger, a water heater, and a hot water circulation tank; the heat exchanger, the hot water circulation tank and the water heater are sequentially connected to form a circulation loop; the liquid outlet of the regeneration liquid tank is connected to the first check valve through the heat exchanger.

5. The device for obtaining water from air on an island according to claim 1, wherein the water purification system comprises a distilled water separator, a purification filter and a fresh water tank; an inlet of the distilled water separator is connected to a vapor-water outlet of the vapor-water separation tank, and a water outlet of the distilled water separator, the purification filter and the fresh water tank are sequentially connected.

6. The device for obtaining water from air on an island according to claim 4, wherein a second two-way valve is disposed between the liquid outlet of the regeneration liquid tank and the heat exchanger.

7. A method for obtaining water for the device for obtaining water from air on an island according to claim 1, comprising the following steps:

introducing humid air on the island into a concentrated solution air water obtaining system, and performing, by the concentrated solution air water obtaining system, a heat and mass transfer to turn the humid air into a dilute solution and relatively low-temperature dry air, wherein the relatively low-temperature dry air is sent into the interior of an island building as interior fresh air;

sending the diluted solution to a solar collector to be heated and delivered to a dilute solution dehydration system;

sending, by the dilute solution dehydration system, the dilute solution to a solution heating system for heating, and then sending the dilute solution back to the dilute solution dehydration system;

spraying, by the dilute solution dehydration system, to evaporate water in the dilute solution, and inputting a water vapor accompanied with air to a water purification system; at the same time, introducing, by a heat pump system, heated humid air of the island into the dilute solution dehydration system, in which the heated humid air is subjected to a heat and mass transfer with the dilute solution to recover heat contained in the heated humid air, and extract water contained in the heated humid air; and cooling, purifying, filtering and storing, by the water purification system, the water vapor.

8. The method for obtaining water for the device for obtaining water from air on an island according to claim 7, further comprising: outputting cold air output from the heat pump system to the concentrated solution air water obtaining system.

* * * * *